United States Patent
Baghel et al.

(10) Patent No.: US 12,531,095 B2
(45) Date of Patent: Jan. 20, 2026

(54) MEMORY WITH REDUNDANT READ OPTIMIZATION

(71) Applicant: QUALCOMM Incorporated, San Diego, CA (US)

(72) Inventors: Asheesh Singh Baghel, Bangalore (IN); Amit Duggal, Bangalore (IN); Sateeshkumar Injarapu, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 91 days.

(21) Appl. No.: 18/757,302

(22) Filed: Jun. 27, 2024

(65) Prior Publication Data

US 2026/0004826 A1  Jan. 1, 2026

(51) Int. Cl.
| | | |
|---|---|---|
| *G11C 7/00* | (2006.01) | |
| *G11C 7/10* | (2006.01) | |
| *H03K 19/173* | (2006.01) | |

(52) U.S. Cl.
CPC ............ *G11C 7/109* (2013.01); *G11C 7/1069* (2013.01); *H03K 19/1737* (2013.01)

(58) Field of Classification Search
CPC ... G11C 7/109; G11C 7/1069; H03K 19/1737
USPC .................................................. 365/189.011
See application file for complete search history.

(56) References Cited

U.S. PATENT DOCUMENTS

| | | | | |
|---|---|---|---|---|
| 6,697,292 | B1 * | 2/2004 | Fukuda | G11C 7/1048 |
| | | | | 365/201 |
| 6,757,852 | B1 * | 6/2004 | Ghassemi | G11C 29/84 |
| | | | | 714/711 |
| 7,242,633 | B1 * | 7/2007 | Ching | G11C 7/1075 |
| | | | | 365/189.04 |
| 10,878,893 | B1 * | 12/2020 | Choserot | G11C 11/412 |
| 11,545,231 | B2 * | 1/2023 | Sancon | G11C 7/1039 |
| 11,640,838 | B2 * | 5/2023 | Pallerla | G11C 7/1087 |
| | | | | 365/233.1 |
| 11,955,169 | B2 * | 4/2024 | Raj | G11C 11/412 |

FOREIGN PATENT DOCUMENTS

| | | | | |
|---|---|---|---|---|
| JP | H06203592 A | * | 7/1994 | ........... G11C 29/846 |
| JP | 2003535430 A | * | 11/2003 | .............. G06F 11/00 |

* cited by examiner

*Primary Examiner* — Viet Q Nguyen
(74) *Attorney, Agent, or Firm* — Loza & Loza, LLP (57) ABSTRACT

A memory is provided with a redundant read logic circuit that detects whether a current read operation should proceed as a redundant or non-redundant read operation. In a redundant read operation, the memory does not assert a word line voltage nor does it enable any sense amplifiers. The data for a redundant read operation is thus not provided by the memory but instead is retrieved from a global input/output (GIO) memory circuit such as a GIO latch.

20 Claims, 6 Drawing Sheets

FIG. 4 comparing a current read address for a current clock cycle to a preceding read address for a preceding clock cycle to determine whether the current read address equals the preceding read address ~500 suppressing a read operation to the current read address in a memory in response to current read address in a current clock cycle equaling the preceding read address in a preceding clock cycle while a write operation to the memory did not occur to a write address equaling the current read address from the preceding clock cycle to the current clock cycle ~505

MEMORY WITH REDUNDANT READ OPTIMIZATION

TECHNICAL FIELD

The present application relates generally to memories, and more specifically, to a memory with redundant read optimization.

BACKGROUND

An embedded memory such as a static random-access memory (SRAM) is a major contributor to the power consumption by a system-on-a-chip (SoC) including the embedded memory. To reduce the power consumption, it is known to divide the SoC into a core (digital) power domain for the processor and a memory (MX) domain for the embedded memories. A memory power supply voltage powers the memory power domain whereas a core power supply voltage powers the core (CX) power domain. During idle periods for an embedded memory, the memory power supply voltage may be lowered such that the memory power domain consumption is significantly reduced yet the bitcells retain their digital contents. However, the memory power supply voltage is then increased during an active mode for the memory power domain so that the memory operation may be conducted at relatively high speeds. Power consumption during the active mode thus remains a concern for the memory power domain.

SUMMARY

In accordance with an aspect of the disclosure, a single-port redundant read memory system is provided that includes: a single-port memory including a first input terminal for a processed chip select signal, wherein the single-port memory is configured to respond to a current read address while the processed chip select signal is asserted and to not respond to the current read address while the processed chip select signal is de-asserted; and a single-port redundant read logic circuit including: an address comparator configured to compare the current read address to a preceding read address; a first logic gate configured to process an output signal from the address comparator with a chip select signal; and a multiplexer configured to select between the chip select signal and an output signal from the first logic gate to form the processed chip select signal.

In accordance with another aspect of the disclosure, a dual-port redundant read memory system is provided that includes: a dual-port memory including a first input terminal for a processed read enable signal, wherein the dual-port memory is configured to respond to a current read address while the processed read enable signal is asserted and to not respond to the current read address while the processed read enable signal is de-asserted; and a dual-port redundant read logic circuit including: a first address comparator configured to compare the current read address to a preceding read address; a second address comparator configured to compare the current read address to a current write address; a first logic gate configured to process an output signal from the first address comparator with an output signal from the second address comparator; and a first multiplexer configured to select for a read enable signal to form the processed read enable signal in response to a first binary value of an output signal from the first logic gate.

Finally, in accordance with another aspect of the disclosure, a method of controlling a read operation is provided that includes: comparing a current read address for a current clock cycle to a preceding read address for a preceding clock cycle to determine whether the current read address equals the preceding read address; and suppressing a read operation to the current read address in a memory in response to current read address in a current clock cycle equaling the preceding read address in a preceding clock cycle while a write operation to the memory did not occur to a write address equaling the current read address from the preceding clock cycle to the current clock cycle.

These and other advantageous features may be better appreciated through the following detailed description.

BRIEF DESCRIPTION OF THE DRAWINGS

Implementations of the present disclosure and their advantages are best understood by referring to the detailed description that follows. It should be appreciated that like reference numerals are used to identify like elements illustrated in one or more of the figures.

DETAILED DESCRIPTION

A read operation to a memory occurs according to an address that identifies a word line. As a result of this addressing, a voltage of the word line is asserted so that bitcells in the row corresponding to the word line provide their digital contents to corresponding columns of bit lines. The columns are typically arranged into multiplexed groups, with each multiplexed group being selected from by a corresponding column multiplexer. The address for the read operation also controls the selection by the column multiplexer so that a selected pair of bit lines are coupled to a sense amplifier that makes a bit decision. The bit decision is latched into a global input/output (GIO) memory circuit in the global input/output path to the memory. A digital core that initiated the read operation thus retrieves the resulting word from the GIO memory circuit as opposed to receiving the bit directly from the sense amplifier.

The following discussion will assume that the GIO memory circuit is a GIO latch but an edge-triggered memory circuit such as a flip-flop may be used in alternative implementations. The storage of the bit from the read operation in the GIO latch is exploited herein to lower the memory power consumption by suppressing redundant read operations to the memory. Although the read operation to the memory is suppressed, the bit that was stored in the GIO latch from the preceding read operation to the redundant read operation is still retained. The digital core may thus advantageously retrieve the stored bit despite the suppression of the redundant read operation. In a non-redundant read operation, a word line voltage is asserted, a sense amplifier makes a bit decision, and so on. But since the redundant read operation is suppressed, none of these power-consuming acts occur. The suppression of the redundant read operation saves substantial power without slowing the memory operation speed.

The definition of a redundant read operation depends upon whether the memory is a single-port memory or a dual-port memory. In a single-port memory, a single port is used for both the read and write operations. The GIO latch for the single port is thus typically shared for both read and write operations. Should a write operation (to any address) intervene between a first read operation and a second read operation to the same address, the second read operation is not a redundant read operation since the write operation wrote into the GIO latch following the first read operation. A redundant read operation for such a single-port memory is thus defined as being a subsequent read operation directed to the same address as for a preceding read operation for which no write operation intervenes between the subsequent and preceding read operations.

In contrast, a dual-port memory has a separate read and write port, each having its own GIO latch. A redundant read operation to a dual-port memory is thus defined as being a current read operation to the same address as a preceding read operation for which no write operation to the same address either intervenes between the current and preceding read operations, occurs in the same clock cycle as the current read operation, or occurs in the same memory clock cycle as the subsequent read operation.

Figure 1:
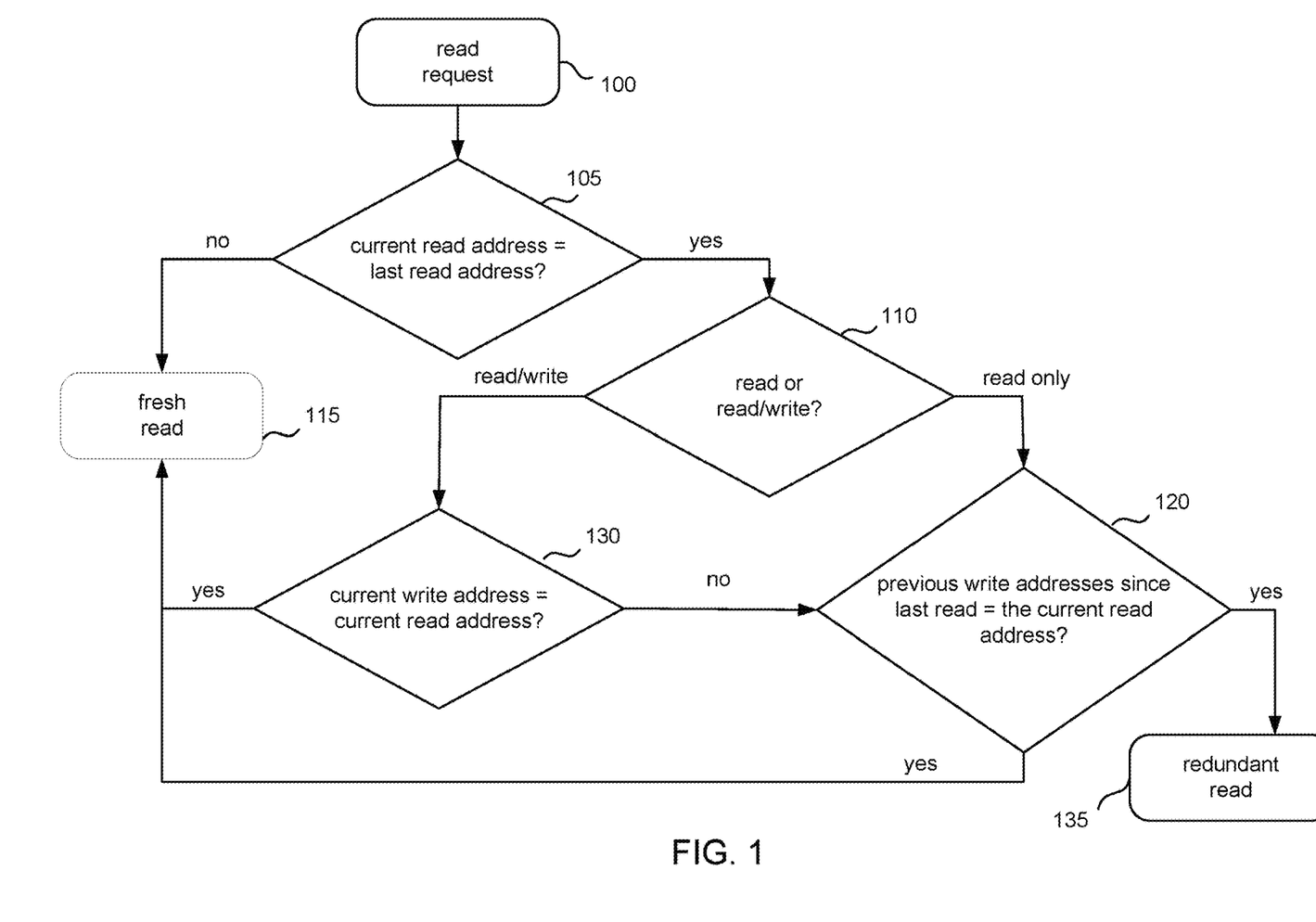
FIG. 1 is a flowchart for a method of determining whether a read operation should proceed as a redundant or non-redundant read operation in accordance with an aspect of the disclosure.

An example process flow for the determination of whether a redundant read operation has occurred for a dual-port memory is shown in FIG. 1. The process begins with a read request for a read operation at a step 100. The address for this read operation is denoted as a current read address whereas the address for the last read operation prior to the current read operation is denoted as a last read address. A step 105 determines whether the current read address equals the last read address. Should the current read address be different from the last read address, the current read operation proceeds as a non-redundant read operation (denoted as a fresh read) in a step 115. Should the current read address equal the last read address, the process continues with a determination in a step 110 of whether the current read operation is occurring in a memory clock cycle in which a current write operation also occurs (a read/write) or whether the current read operation is the only operation in the memory clock cycle (a read only). If both a read and a write operation occur, the process determines in a step 130 of whether the current write address equals the current read address in a step 130. If the current write address and the current read address are equal, the read operation proceeds as a non-redundant read operation in step 115. If the current write address does not equal the current read address, the process determines in a step 120 whether any write operations intervened between the last read operation and the memory cycle for the current read operation. Should any of these intervening write operations be directed to the current read address, the read operation proceeds as a non-redundant read operation in step 115. If there are no intervening write operations that are directed to the current read address, the read operation occurs as a redundant read operation in step 135. Should the current read operation be a read only operation (no write operation occurring in the same memory clock cycle) as determined from step 110, the process proceeds as discussed for step 120.

Figure 2:
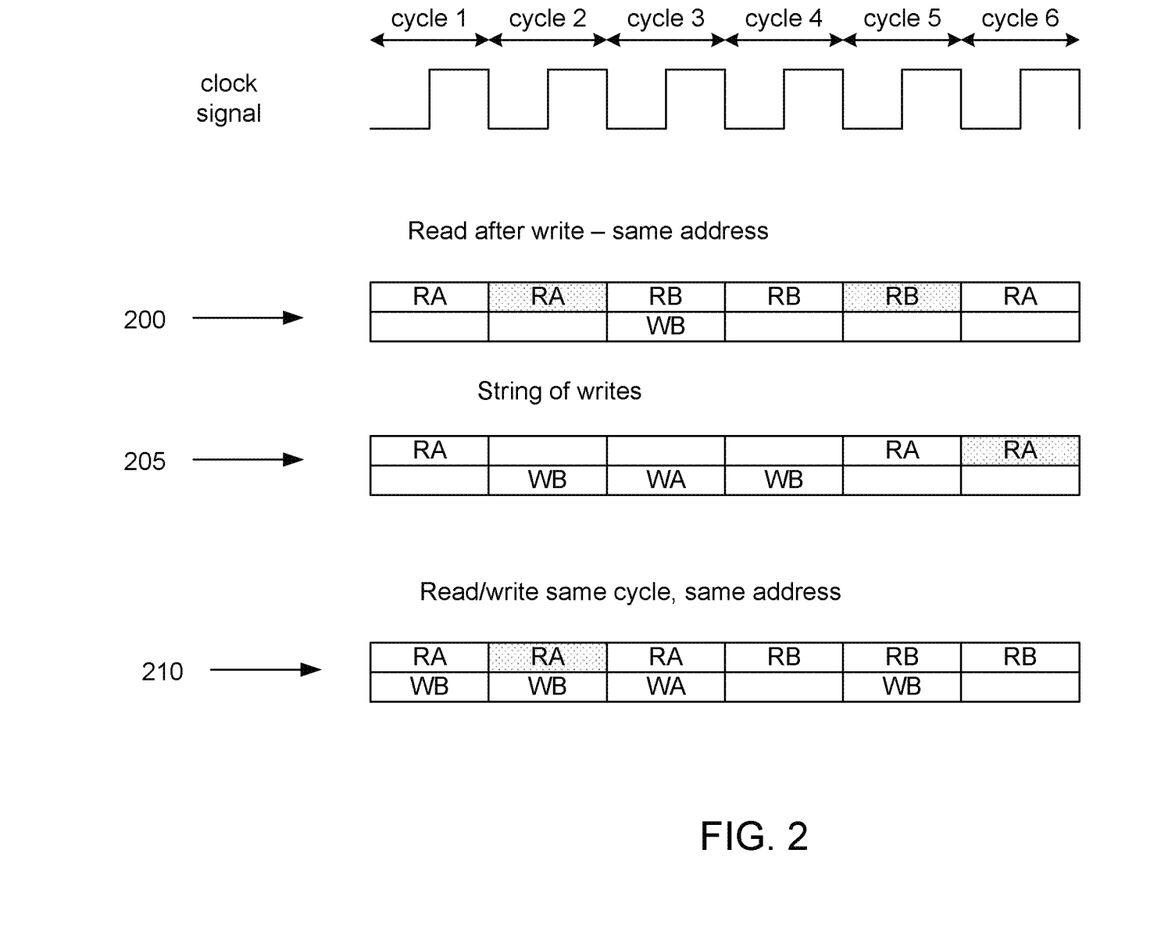
FIG. 2 illustrates some example series of read and write operations in which some of the read operations may proceed as redundant read operations in accordance with an aspect of the disclosure.

Some example read and write operations will now be discussed with respect to FIG. 2. The read and write operations are synchronous with cycles of a clock signal. A first series 200 of read and write operations illustrates how a consecutive read operations to the same address do not trigger a redundant read operation (read after write-same address). In a first cycle of the clock signal, series 200 begins with a read operation to an address A (RA). Another RA read operation occurs in a second clock cycle followed by a read operation to an address B (RB) in a third clock cycle. In a fourth clock cycle, another RB read operation occurs followed by yet another RB read operation in a fifth clock cycle.

Since the first RA read operation in series 200 is an initial read operation, it must be a non-redundant read operation. Whether any of the subsequent read operations may proceed as redundant read operations will now be discussed. The first inquiry corresponds to step 105 of FIG. 1, which is whether the current read address equals the last read address. It may be seen that this occurs in series 200 at the second clock cycle, the fourth clock cycle, and the fifth clock cycle. Since a write operation that was directed to the address A did not occur in either the first cycle or the second cycle, the RA read operation in the second cycle of series 200 is a redundant read operation. But with respect to the RB read operation in the fourth clock cycle, a write operation to the address B (WB) occurred in the third clock cycle. As given by the determination from step 120 and step 115 of FIG. 1, the read operation RB in the fourth clock cycle thus occurs as non-redundant (fresh) read operation. Since a write operation that was directed to the address B did not occur in either the fourth cycle or the fifth cycle, the RB read operation in the fifth cycle of series 200 is a redundant read operation. Finally, a non-redundant RA read operation occurs in the sixth clock cycle.

A second series 205 of read and write operations illustrates the redundant read operation determination with respect to a string of writes. In the first cycle of the clock signal, series 205 begins with a non-redundant RA read operation. Another RA read operation occurs in the fourth and fifth clock cycles. Whether any of these subsequent read operations may proceed as redundant read operations will now be discussed. The first inquiry corresponds to step 105 of FIG. 1, which is whether the current read address equals the last read address. It may be seen that this occurs in series 205 at the fourth clock cycle and at the fifth clock cycle. But between the RA read operation in the first clock cycle and the RA read operation in the fourth clock cycle are three write operations including a WB write operation in the second clock cycle, a write operation to the address A (WA) in the third clock cycle, and a WB write operation in the fourth clock cycle. As given by the determination in step 120 (FIG. 1), the WA write operation in the third clock cycle causes the RA read operation in the fourth clock cycle to be a fresh read operation. Since no WA write operation occurs in either the fourth or fifth clock cycles, the RA read operation in the fifth clock cycle is a redundant read operation.

A third series 210 of read and write operations illustrates a read/write cycle having the same address in both the read and write operation (read/write same cycle, same address). The first inquiry corresponds to step 105 of FIG. 1, which is whether the current read address equals the last read address. It may be seen that this occurs in series 210 at the second clock cycle, the third clock cycle, the fifth clock cycle, and the sixth clock cycle. Since a WA write operation does not occur in either the first clock cycle or the second clock cycle, the RA read operation in the second clock cycle is a redundant read operation. But a WA write operation in the third clock cycle prevents the RA read operation in the third clock cycle from being a redundant read operation. Similarly, a WB write operation in the fifth clock cycle prevents the RB read operations in the fifth and sixth clock cycles from being redundant read operations.

Figure 3:
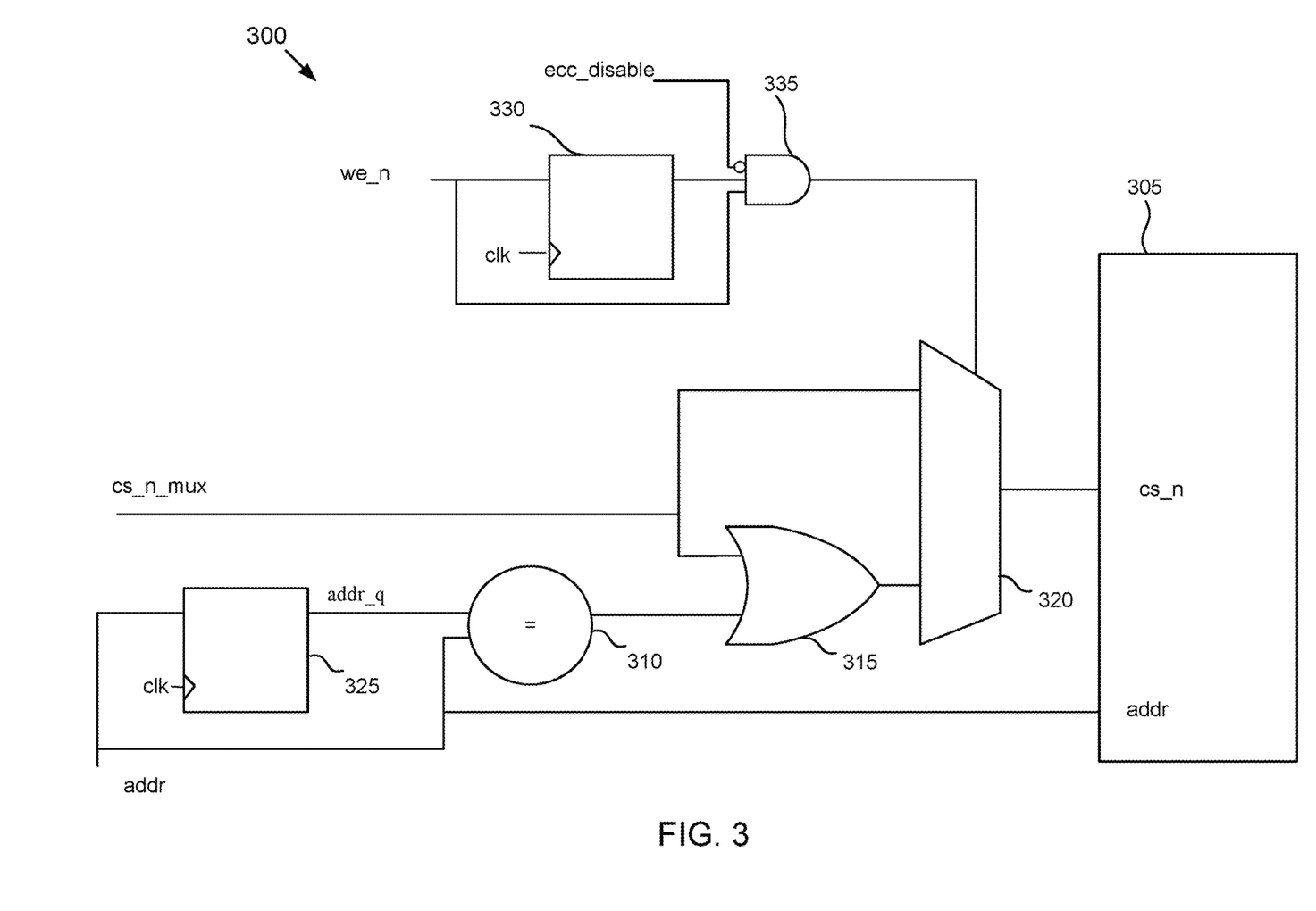
FIG. 3 illustrates a redundant read memory system including a single-port memory and a single-port redundant read logic circuit in accordance with an aspect of the disclosure.

Some example redundant read logic circuits will now be discussed for the determination of whether a current read operation should proceed as a redundant or non-redundant read operation will now be discussed. A single-port redundant read logic circuit 300 for controlling whether a current read operation to a single-port memory 305 proceeds as a redundant read operation or a non-redundant read operation is shown in FIG. 3. Should the redundant read logic circuit 300 determine that a current read operation should proceed as a redundant read operation, the redundant read logic circuit 300 de-asserts a processed chip select signal (cs_n) to the single-port memory 305. In the absence of an assertion of the processed chip select signal, the single-port memory 305 does not respond to an address signal (addr) for the current read operation and thus does not assert the corresponding word line voltage nor triggers sense amplifiers and related circuitry. As defined herein, a binary signal such as the processed chip select signal is deemed to be asserted when the signal is logically true, regardless of whether an active-high or active-low convention is used. In an active-high convention, an asserted signal is charged to a power supply voltage and discharged to ground when de-asserted. Conversely, an asserted signal is grounded in an active-low convention and charged to a power supply voltage when de-asserted. In the single-port memory 305, the processed chip select signal is an active-low signal, but it will be appreciated that the redundant-read logic circuit 300 is readily adapted to control an active-high process chip select signal.

In the following discussion, it is assumed that a current read operation is directed to an address in the single-port memory 305. With respect to this current read operation, a memory controller (not illustrated) asserts an active-low (unprocessed) chip select signal denoted herein as cs_n_mux. Should a current read operation proceed as a non-redundant (fresh) read operation, a multiplexer 320 in the redundant read logic circuit 300 passes the chip select signal through to the single-port memory 305 to form the processed chip select signal. The chip select signal may thus pass or may not pass through the multiplexer 320 depending upon whether the current read operation is a non-redundant read operation or is a redundant read operation.

To control the multiplexer 320, the redundant read logic circuit 300 includes a memory circuit such as a register 330 that is clocked responsive to the system clock signal (clk) to register an active-low write enable signal (we_n). The register 330 thus registers a preceding write enable signal (we_n_q). An AND gate 335 ANDs the current write enable signal with the preceding write enable signal to control the multiplexer 320. To allow an ability to switch off the redundant read detection, the AND gate 335 also ANDs an inverted version of an active-high redundant read disable signal (ecc_disable). An output signal from the AND gate 335 will thus be asserted only if the current memory operation is a read operation, the preceding memory operation was also a read operation, and the redundant read disable signal is not asserted. If, however, the memory operation in the preceding clock cycle was a write operation, the output signal from the AND gate 335 is de-asserted. Similarly, this output signal is de-asserted if the current memory operation is a write operation or if the redundant read disable signal is asserted.

If the current read address differs from the preceding read address, the output signal of the address comparator 310 will be de-asserted. In turn, the output signal of the OR gate 315 will also be de-asserted. The processed chip select signal to the single-port memory 305 will then be asserted (since in this implementation, the processed chip select signal is active-low), which causes the current read operation to proceed as a non-redundant read operation. In that case, the single-port memory 305 will assert the word line corresponding to the address and enable the corresponding sense amplifier(s). Should the current memory operation not be directed to the single-port memory 305, the unprocessed chip select signal cs_n_mux will be de-asserted. Since the unprocessed chip select signal is an active-low signal in the implementation shown in FIG. 3, the unprocessed chip select signal is charged to the memory power supply voltage to be de-asserted. Regardless of whether the multiplexer 320 selects for the unprocessed chip select signal or the output signal from the OR gate 315, the charging of the unprocessed chip select signal to the memory power supply voltage suppresses the single-stage memory 305 from responding while the unprocessed chip select signal is charged.

Should the redundant read logic circuit 300 determine that a current read operation should proceed as a redundant read operation, the redundant read logic circuit 300 de-asserts the processed chip select signal (cs_n) to the single-port memory 305. Note that such a de-assertion is a charging to the memory power supply voltage due to the processed chip select signal being an active-low signal. In the absence of an assertion of the processed chip select signal, the single-port memory 305 does not respond to an address signal (addr) for the current read operation and thus does not assert the corresponding word line voltage nor triggers sense amplifiers and related circuitry.

If the output signal from the AND gate 335 is de-asserted, a redundant read operation is not possible such that the multiplexer 320 passes the unprocessed chip select signal as the processed chip select signal to the single-port memory 305. If, however, the output signal from the AND gate 335 is asserted, the multiplexer 320 selects for the output of an OR gate 315. The OR gate 315 ORs an output signal from an address comparator 310 with the unprocessed chip select signal. The address comparator 310 compares the current read address (addr) in the current clock cycle to the preceding read address as registered by a register 325. Should these two addresses be the same, the address comparator 310 asserts its output signal. This asserted output signal passes through the OR gate 315 to the multiplexer 320 and will pass through the multiplexer 320 as the processed chip select signal (cs_n) should both the previous and the current memory operations be read operations (and the redundant read disable signal is not asserted). The single-port memory 305 will thus suppress a read operation in response to the de-asserted processed chip select signal such that the read operation proceeds as a redundant read operation. With the read operation proceeding as a redundant read operation, the digital core (e.g., a processor, not illustrated) reading from the single-port memory 305 will receive the desired data from the GIO latch (not illustrated). The GIO latch had latched the data in the preceding read operation that was to the same address in the single-port memory 305 as the current read operation. It is thus transparent to the digital core whether the read operation proceeds as a redundant or non-redundant read operation.

Figure 4:
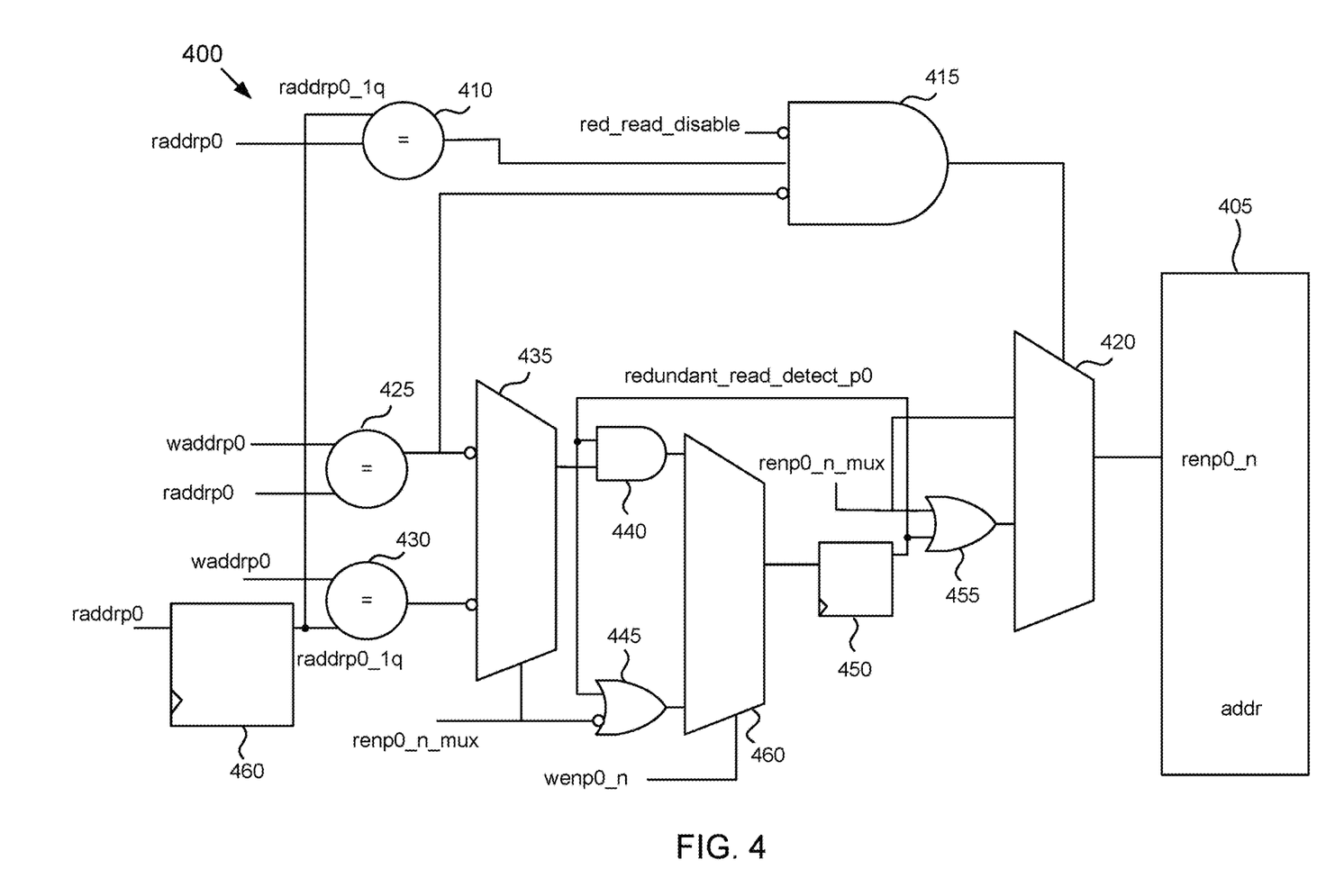
FIG. 4 illustrates a redundant read memory system including a dual-port memory and a dual-port redundant read logic circuit in accordance with an aspect of the disclosure.

A dual-port redundant read logic circuit 400 for controlling whether a current read operation to a dual-port memory 405 proceeds as a redundant read operation or a non-redundant read operation is shown in FIG. 4. Since a redundant read operation may occur in the same clock cycle as a write operation to the dual-port memory 405, the dual-port redundant read logic circuit does not control a binary state of a chip select signal (not illustrated in FIG. 4) to the dual-port memory 405 because a de-assertion of the chip select signal would undesirably suppress the dual-port memory 405 from performing the write operation. Thus, the dual-port redundant read logic circuit 400 controls the assertion or de-assertion of a read enable signal to the dual-port memory 405. Because of its dual ports (port 0 and port 1) to each bitcell, the dual-port memory 405 responds to a port 0 read enable signal (renp0_n) and a port 1 read enable signal (not illustrated). Since the logic flow is analogous for each port, the dual-port redundant read logic circuit 400 is illustrated for only the control of a port 0 read enable signal. In this implementation, the read enable signals are active-low read enable signals, but it will be appreciated that the dual-port redundant read logic circuit 400 is readily adapted for the processing of active-high read enable signals.

A first multiplexer 420 provides a processed port 0 read enable signal (renp0_n) to the dual-port memory 420 by selecting between an unprocessed port 0 read enable signal (renp0_n_mux) from a memory controller (not illustrated) and an output signal from an OR gate 455. The memory controller generates the un-processed port 0 read enable signal renp0_n_mux for the read operation in the current clock cycle. Should the memory controller intend that a read operation be conducted in the current clock cycle, the unprocessed port 0 read enable signal renp0_n_mux is asserted, otherwise it is de-asserted. In the illustrated implementation, the unprocessed port 0 read enable signal renp0_n_mux is an active-low signal so it is asserted by being grounded, but it will be appreciated that an active-high read enable signal may be used in alternative implementations.

To control the selection by the multiplexer 420, a first address comparator 410 compares a port 0 read address signal raddrp0 (the address for the current read operation) to the port 0 read address signal raddrp0_1q from the preceding read operation as registered by a register 460. An output signal of the first address comparator 410 will thus be asserted if the current port 0 read address equals the preceding port 0 read address (raddrp0 being equal to raddrp0_1q). But note that even if these addresses are the same, the current read operation should not proceed as a redundant read operation if a write operation address waddrp0 for the current clock cycle equals the current port 0 read address raddrp0. Thus, a second address comparator 425 compares waddrp0 to raddrp0. Should these addresses be equal, the second address comparator 425 asserts its output signal. If these addresses are not the same, the second address comparator 425 de-asserts its output signal. An AND gate 415 ANDs the output signal from the first address comparator 410 with an inverted version of the output signal from the second address comparator 425.

An output signal from the AND gate 415 will thus only be asserted if raddrp0 equals raddrp0_1q and does not equal waddrp0. To provide the ability to suppress redundant read operations so that all read operations proceed as non-redundant read operations, the AND gate 415 also ANDs an inverted version of an active-high redundant read disable signal (red_read_disable). The output signal from the AND gate 415 controls the selection by the multiplexer 420 such that the multiplexer 420 selects for the output signal from the OR gate 455 only if the current and preceding port 0 read addresses match, the current port 0 write address does not match the current port 0 read address, and the redundant read disable signal is not asserted. If these conditions are not met, the multiplexer 420 selects for the un-processed port 0 read enable signal renp0_n_mux to form the processed read enable signal renp0_n.

A third address comparator 430 compares the current port 0 write address waddrp0 to the preceding port 0 read address raddrp0_1q. To use this comparison to detect whether a write operation in a string of writes equals the preceding read address such as discussed with regard to series 205 will now be discussed. A second multiplexer 435 selects for an inverted version of the output signal from the third address comparator 430 if the active-low un-processed port 0 read enable signal renp0_n_mux is de-asserted and selects for an inverted version of the output signal from the second address comparator 425 if the renp0_n_mux signal is asserted. An AND gate 440 ANDs an output signal from the multiplexer 435 with a port 0 redundant read detection signal (redundant_read_detect_p0) as registered by a memory circuit such as a register 450. The OR gate 455 ORs the un-processed port 0 read enable signal renp0_n_mux with the redundant read detection signal. An OR gate 445 ORs the redundant read detection signal with an inverted version of the un-processed port 0 read enable signal renp0_n_mux. A third multiplexer 460 controlled by the port 0 write enable signal wendp0_n selects between the output signals from the AND gate 440 and the OR gate 445.

Referring again to the control of the multiplexer 420, recall that the multiplexer 420 will only select for the output signal of the OR gate 455 if there is a possibility of a redundant read operation in that the current and preceding port 0 read addresses are equal. But the current read operation cannot proceed as a redundant read operation if the current port 0 write address equals the current port 0 read address or if a write operation in an intervening clock cycle is directed to the same address as the current port 0 read address. The third address comparator 430 detects for whether the current port 0 write address equals the preceding port 0 read address. For example, consider the series 205 of FIG. 2. The processed port 0 read enable signal renp0_n is de-asserted for the second, third, and fourth clock cycles because only write operations occur in those clock cycles for series 205. The second multiplexer 435 will thus select for the inverted version of the output signal of the third address comparator 430 in those clock cycles. Similarly, the third multiplexer 460 will select for the output of the AND gate 440 in those clock cycles because the port 0 write enable signal wenp0_n is asserted for those clock cycles (note that wenp0_n is an active-low signal, so it is discharged to ground when asserted). Since a read operation is not activated in the second, third, and fourth clock cycles of the series 205, the preceding port 0 read address is not updated and thus remains the same as the RA address from the first clock cycle. The third address comparator 430 will thus assert its output signal in the third clock cycle of series 205 since the write address is WA in that clock cycle, which equals RA. The output signal from the AND gate 440 will thus be de-asserted since the second multiplexer 435 selects for an inverted version of this asserted output signal from the third address comparator 430 such that the redundant read detection signal is de-asserted in the third clock cycle. Due to the feedback from the register 450 to the AND gate 440 and to the OR gate 445, the de-assertion of the redundant read detection signal causes a string of write operations such as shown in series 205 that includes a matching write address to the preceding read address to trigger a non-redundant read operation. It will be appreciated that the logic gates discussed with regard to the single-port redundant read logic circuit 300 and the dual-port redundant read logic circuit 400 are merely exemplary and may be replaced by other types of logic gates in alternative implementations depending upon whether the various signals are active-high or active-low.

Figure 5:
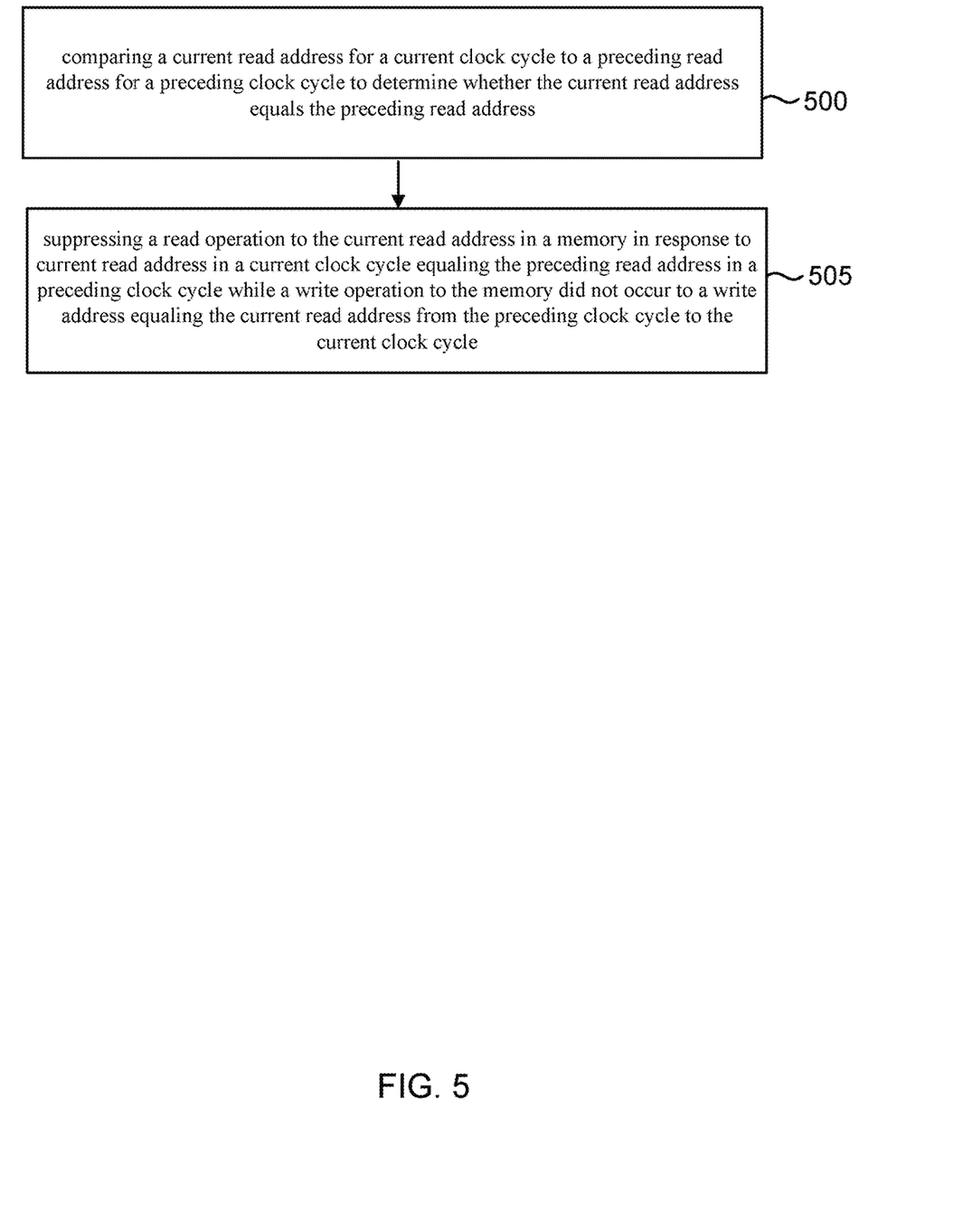
FIG. 5 is a flowchart for a method of controlling whether a read operation proceeds as a redundant read operation in accordance with an aspect of the disclosure.

An example method of operation for a redundant read memory system will now be discussed with reference to the flowchart of FIG. 5. The method includes an act 500 of comparing a current read address for a current clock cycle to a preceding read address for a preceding clock cycle to determine whether the current read address equals the preceding read address. The comparison by the address comparator 410 or the address comparator 310 is an example of act 500. The method further includes an act 505 of suppressing a read operation to the current read address in a memory in response to current read address in a current clock cycle equaling the preceding read address in a preceding clock cycle while a write operation to the memory did not occur to a write address equaling the current read address from the preceding clock cycle to the current clock cycle. The de-assertion of the processed chip select signal or of the processed read enable signal as discussed herein is an example of act 505.

Figure 6:
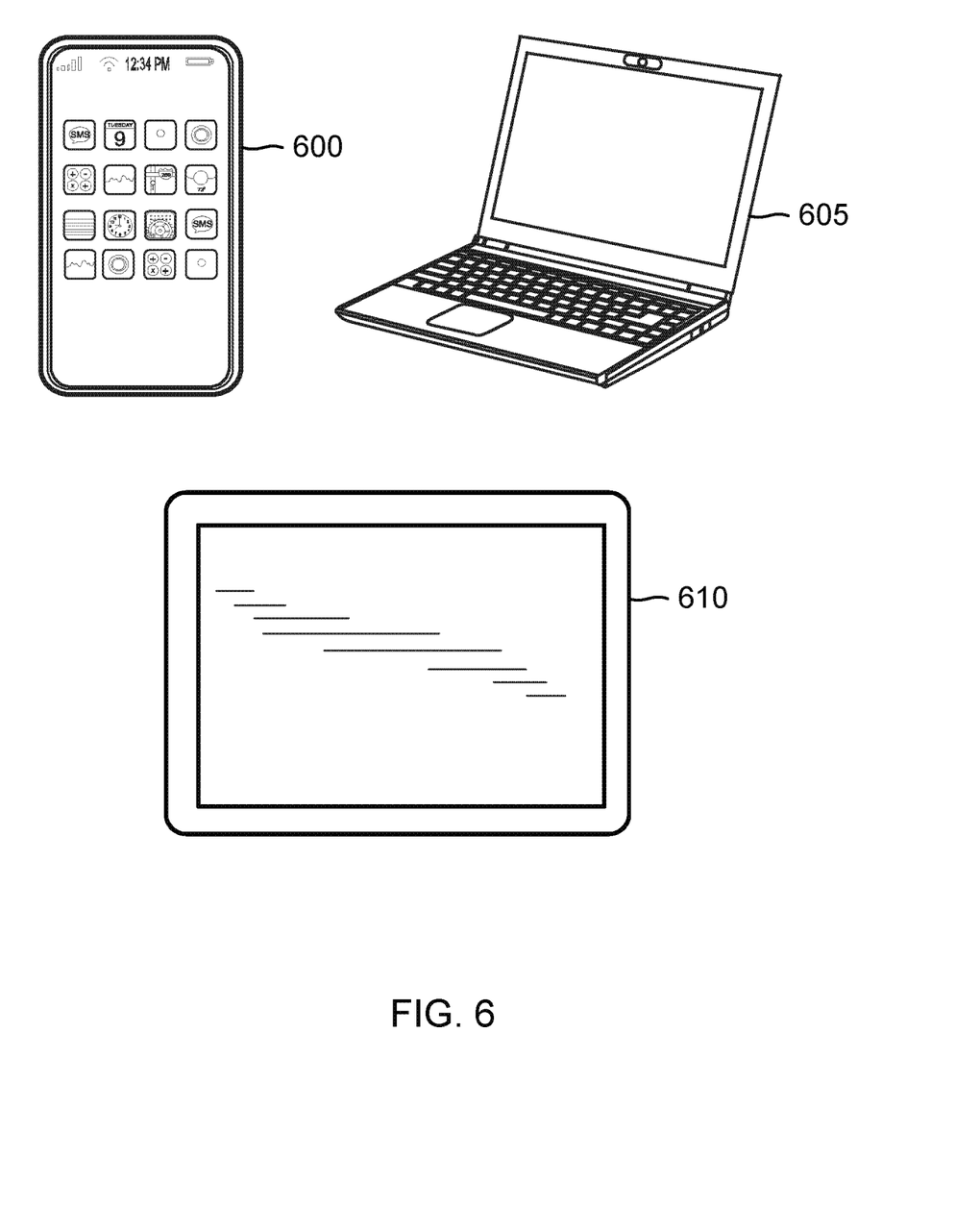
FIG. 6 illustrates some example electronic systems including a redundant read memory system in accordance with an aspect of the disclosure.

A redundant memory system including a redundant read logic circuit as disclosed herein may be incorporated in a wide variety of electronic systems. For example, as shown in FIG. 6, a cellular telephone 500, a laptop computer 505, and a tablet 510 may all include a memory system in accordance with the disclosure. Other exemplary electronic systems such as a video player, a communication device, and a personal computer may also be configured with a memory system constructed in accordance with the disclosure.

Some example implementations are described by the following numbered clauses:

Clause 1. A single-port redundant read memory system, comprising:
 a single-port memory including a first input terminal for a processed chip select signal, wherein the single-port memory is configured to respond to a current read address while the processed chip select signal is asserted and to not respond to the current read address while the processed chip select signal is de-asserted; and
 a single-port redundant read logic circuit including:
  an address comparator configured to compare the current read address to a preceding read address;
  a first logic gate configured to process an output signal from the address comparator with a chip select signal; and
  a multiplexer configured to select between the chip select signal and an output signal from the first logic gate to form the processed chip select signal.

Clause 2. The single-port redundant read memory system of clause 1, wherein the single-port redundant read logic circuit further includes:
 a second logic gate configured to process a current write enable signal with a preceding write enable signal, wherein an output signal from the second logic gate controls a selection by the multiplexer between the chip select signal and the output signal from the first logic gate.

Clause 3. The single-port redundant read memory system of clause 2, wherein the first logic gate comprises an OR gate.

Clause 4. The single-port redundant read memory system of any of clauses 1-2, wherein the second logic gate comprises an AND gate.

Clause 5. The single-port redundant read memory system of clause 4, wherein the AND gate is further configured to AND the current write enable signal with the preceding write enable signal and with an inverted version of a redundant read enable signal.

Clause 6. The single-port redundant read memory system of clause 5, wherein the current write enable signal, the preceding write enable signal, the chip select signal, and the processed chip select signal are all active-low signals, and wherein the redundant read enable signal is an active-high signal.

Clause 7. The single-port redundant read memory system of clause 2, further comprising:
 a first memory circuit configured to store the current read address signal responsive to a clock signal to form the preceding read address signal.

Clause 8. The single-port redundant read memory system of clause 7, further comprising:
 a second memory circuit configured to store the current write enable signal responsive to the clock signal to form the preceding write enable signal.

Clause 9. The single-port redundant read memory system of clause 8, wherein the first memory circuit comprises a first register responsive to a clock signal and the second memory circuit comprises a second register responsive to the clock signal.

Clause 10. A dual-port redundant read memory system, comprising:
 a dual-port memory including a first input terminal for a processed read enable signal, wherein the dual-port memory is configured to respond to a current read address while the processed read enable signal is asserted and to not respond to the current read address while the processed read enable signal is de-asserted; and
 a dual-port redundant read logic circuit including:
  a first address comparator configured to compare the current read address to a preceding read address;
  a second address comparator configured to compare the current read address to a current write address;
  a first logic gate configured to process an output signal from the first address comparator with an output signal from the second address comparator; and
  a first multiplexer configured to select for a read enable signal to form the processed read enable signal in response to a first binary value of an output signal from the first logic gate.

Clause 11. The dual-port redundant read memory system of clause 10, wherein the first binary value of the output signal from the first logic gate is a binary zero.

Clause 12. The dual-port redundant read memory system of any of clauses 10-11, wherein the first logic gate comprises an AND gate configured to AND the output signal from the first address comparator with an inverted version of the output signal from the second address comparator.

Clause 13. The dual-port redundant read memory system of clause 12, wherein the AND gate is further configured to AND the output signal from the first address comparator with the inverted version of the output signal from the second address comparator and with an inverted version of a redundant read disable signal.

Clause 14. The dual-port redundant read memory system of any of clauses 10-13, further comprising:
  a third address comparator configured to compare the current write address with a preceding read address;
  a second multiplexer configured to select between the output signal from the second address comparator and an output signal from the third address comparator;
  a first memory circuit configured to store a redundant read detection signal;
  a second logic gate configured to process an output signal from the second multiplexer with the redundant read detection signal;
  a third logic gate configured to process the redundant read detection signal with an inverted version of the read enable signal; and
  a third multiplexer configured to select between an output signal from the second logic gate and an output signal from the third logic gate, wherein the first memory circuit is further configured to store an output signal from the third multiplexer to form the redundant read detection signal.

Clause 15. The dual-port redundant read memory system of clause 14, further comprising: a fourth logic gate configured to process the read enable signal with the redundant read detection signal, wherein the first multiplexer is configured to select between the read enable signal and an output signal from the fourth logic gate to form the processed read enable signal.

Clause 16. The dual-port redundant read memory system of clause 15, wherein the second logic gate comprises an AND gate, the third logic gate comprises an OR gate, and the fourth logic gate comprises an OR gate.

Clause 17. A method of controlling a read operation, comprising:
  comparing a current read address for a current clock cycle to a preceding read address for a preceding clock cycle to determine whether the current read address equals the preceding read address; and
  suppressing a read operation to the current read address in a memory in response to current read address in a current clock cycle equaling the preceding read address in a preceding clock cycle while a write operation to the memory did not occur to a write address equaling the current read address from the preceding clock cycle to the current clock cycle.

Clause 18. The method of clause 17, further comprising:
  performing a read operation to the current read address in the memory in response to the current read address not equaling the preceding read address.

Clause 19. The method of clause 18, wherein performing the read operation to the current read address comprises performing a single-port read operation.

Clause 20. The method of clause 18, wherein performing the read operation to the current read address comprises performing a dual-port read operation.

As those of some skill in this art will by now appreciate and depending on the particular application at hand, many modifications, substitutions and variations can be made in and to the materials, apparatus, configurations and methods of use of the devices of the present disclosure without departing from the scope thereof as defined by the appended claims. In light of this, the scope of the present disclosure should not be limited to that of the particular implementations illustrated and described herein, as they are merely by way of some examples thereof, but rather, should be fully commensurate with that of the claims appended hereafter and their functional equivalents.

What is claimed is:

1. A single-port redundant read memory system, comprising:
  a single-port memory including a first input terminal for a processed chip select signal, wherein the single-port memory is configured to respond to a current read address while the processed chip select signal is asserted and to not respond to the current read address while the processed chip select signal is de-asserted; and
  a single-port redundant read logic circuit including:
    an address comparator configured to compare the current read address to a preceding read address;
    a first logic gate configured to process an output signal from the address comparator with a chip select signal; and
    a multiplexer configured to select between the chip select signal and an output signal from the first logic gate to form the processed chip select signal.

2. The single-port redundant read memory system of claim 1, wherein the single-port redundant read logic circuit further includes:
  a second logic gate configured to process a current write enable signal with a preceding write enable signal, wherein an output signal from the second logic gate controls a selection by the multiplexer between the chip select signal and the output signal from the first logic gate.

3. The single-port redundant read memory system of claim 2, wherein the first logic gate comprises an OR gate.

4. The single-port redundant read memory system of claim 2, wherein the second logic gate comprises an AND gate.

5. The single-port redundant read memory system of claim 4, wherein the AND gate is further configured to AND the current write enable signal with the preceding write enable signal and with an inverted version of a redundant read enable signal.

6. The single-port redundant read memory system of claim 5, wherein the current write enable signal, the preceding write enable signal, the chip select signal, and the processed chip select signal are all active-low signals, and wherein the redundant read enable signal is an active-high signal.

7. The single-port redundant read memory system of claim 2, further comprising:
  a first memory circuit configured to store the current read address signal responsive to a clock signal to form the preceding read address signal.

8. The single-port redundant read memory system of claim 7, further comprising:
  a second memory circuit configured to store the current write enable signal responsive to the clock signal to form the preceding write enable signal.

9. The single-port redundant read memory system of claim 8, wherein the first memory circuit comprises a first register responsive to a clock signal and the second memory circuit comprises a second register responsive to the clock signal.

10. A dual-port redundant read memory system, comprising:
  a dual-port memory including a first input terminal for a processed read enable signal, wherein the dual-port memory is configured to respond to a current read address while the processed read enable signal is asserted and to not respond to the current read address while the processed read enable signal is de-asserted; and a dual-port redundant read logic circuit including:
- a first address comparator configured to compare the current read address to a preceding read address;
- a second address comparator configured to compare the current read address to a current write address;
- a first logic gate configured to process an output signal from the first address comparator with an output signal from the second address comparator; and
- a first multiplexer configured to select for a read enable signal to form the processed read enable signal in response to a first binary value of an output signal from the first logic gate.

11. The dual-port redundant read memory system of claim 10, wherein the first binary value of the output signal from the first logic gate is a binary zero.

12. The dual-port redundant read memory system of claim 11, wherein the first logic gate comprises an AND gate configured to AND the output signal from the first address comparator with an inverted version of the output signal from the second address comparator, and wherein the dual-port redundant read memory system is incorporated within a cellular telephone.

13. The dual-port redundant read memory system of claim 12, wherein the AND gate is further configured to AND the output signal from the first address comparator with the inverted version of the output signal from the second address comparator and with an inverted version of a redundant read disable signal.

14. The dual-port redundant read memory system of claim 10, further comprising:
- a third address comparator configured to compare the current write address with a preceding read address;
- a second multiplexer configured to select between the output signal from the second address comparator and an output signal from the third address comparator;
- a first memory circuit configured to store a redundant read detection signal;
- a second logic gate configured to process an output signal from the second multiplexer with the redundant read detection signal;
- a third logic gate configured to process the redundant read detection signal with an inverted version of the read enable signal; and
- a third multiplexer configured to select between an output signal from the second logic gate and an output signal from the third logic gate, wherein the first memory circuit is further configured to store an output signal from the third multiplexer to form the redundant read detection signal.

15. The dual-port redundant read memory system of claim 14, further comprising:
- a fourth logic gate configured to process the read enable signal with the redundant read detection signal, wherein the first multiplexer is configured to select between the read enable signal and an output signal from the fourth logic gate to form the processed read enable signal.

16. The dual-port redundant read memory system of claim 15, wherein the second logic gate comprises an AND gate, the third logic gate comprises an OR gate, and the fourth logic gate comprises an OR gate.

17. A method of controlling a read operation, comprising:
- comparing a current read address for a current clock cycle to a preceding read address for a preceding clock cycle to determine whether the current read address equals the preceding read address; and
- suppressing a read operation to the current read address in a memory in response to current read address in a current clock cycle equaling the preceding read address in a preceding clock cycle while a write operation to the memory did not occur to a write address equaling the current read address from the preceding clock cycle to the current clock cycle.

18. The method of claim 17, further comprising: performing a read operation to the current read address in the memory in response to the current read address not equaling the preceding read address.

19. The method of claim 18, wherein performing the read operation to the current read address comprises performing a single-port read operation.

20. The method of claim 18, wherein performing the read operation to the current read address comprises performing a dual-port read operation.

* * * * *